(12) United States Patent
Namioka et al.

(10) Patent No.: US 11,182,362 B2
(45) Date of Patent: Nov. 23, 2021

(54) CALCULATING DEVICE, DATA BASE SYSTEM, CALCULATION SYSTEM, CALCULATION METHOD, AND STORAGE MEDIUM

(71) Applicant: KABUSHIKI KAISHA TOSHIBA, Minato-ku (JP)

(72) Inventors: Yasuo Namioka, Nerima (JP); Akihiro Yamaguchi, Kita (JP); Masakazu Hattori, Yokohama (JP); Koichi Yamagata, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 9 days.

(21) Appl. No.: 16/743,016

(22) Filed: Jan. 15, 2020

(65) Prior Publication Data

US 2020/0226110 A1  Jul. 16, 2020

(30) Foreign Application Priority Data

Jan. 16, 2019 (JP) .............................. JP2019-005415
Nov. 21, 2019 (JP) .............................. JP2019-210374

(51) Int. Cl.
   *G06F 16/00* (2019.01)
   *G06F 16/21* (2019.01)
   (Continued)

(52) U.S. Cl.
   CPC ........ *G06F 16/217* (2019.01); *G06F 11/3409* (2013.01); *G06F 11/3452* (2013.01);
   (Continued)

(58) Field of Classification Search
   CPC .. G06F 16/215; G06F 16/217; G06F 16/2462; G06F 16/278; G06F 11/3409; G06F 11/3452
   See application file for complete search history.

(56) References Cited

U.S. PATENT DOCUMENTS

| 9,330,119 B2 | 5/2016 | Chan et al. |
| 9,912,609 B2 | 3/2018 | Jacob et al. |

(Continued)

FOREIGN PATENT DOCUMENTS

| CN | 104184813 A | * 12/2014 |
| CN | 107562542 A | * 1/2018 |

(Continued)

*Primary Examiner* — Diedra McQuitery
(74) *Attorney, Agent, or Firm* — Oblon, McClelland, Maier & Neustadt, L.L.P.

(57) ABSTRACT

According to one embodiment, a calculating device performs at least a calculation for a database system. A database of the database system is split into a plurality of partitions and placed in a plurality of nodes. The device is configured to accept statistical information relating to the plurality of partitions and the plurality of nodes and being collected by the plurality of nodes, and generate fluctuation information by using the statistical information and perturbation information. The perturbation information corresponds to statistical fluctuation of the statistical information. The device is configured to calculate a placement of the plurality of partitions in the plurality of nodes by using the statistical information and the fluctuation information. The placement is capable of improving a performance of the database system.

12 Claims, 15 Drawing Sheets

(51) Int. Cl.
   *G06F 16/27* (2019.01)
   *G06F 16/215* (2019.01)
   *G06F 16/2458* (2019.01)
   *G06F 11/34* (2006.01)

(52) U.S. Cl.
   CPC ........ *G06F 16/215* (2019.01); *G06F 16/2462* (2019.01); *G06F 16/278* (2019.01)

(56) References Cited

U.S. PATENT DOCUMENTS

| | | |
|---|---|---|
| 10,055,262 B1 * | 8/2018 | Thomas ................. G06F 9/5083 |
| 10,606,892 B1 * | 3/2020 | Broecheler ......... G06F 16/9024 |
| 2015/0254330 A1 | 9/2015 | Chan et al. |
| 2016/0171073 A1 | 6/2016 | Hattori |
| 2017/0236067 A1 | 8/2017 | Tjiong |
| 2018/0054477 A1 * | 2/2018 | Chivukula .......... H04L 41/0896 |

FOREIGN PATENT DOCUMENTS

| | | |
|---|---|---|
| CN | 108009003 A * | 5/2018 |
| JP | 2017-142800 A | 8/2017 |
| JP | 2017-529593 A | 10/2017 |
| JP | 2018-509709 A | 4/2018 |
| WO | WO 2015/029139 A1 | 3/2015 |

* cited by examiner

| DATA RETENTION TABLE | | PARTITION | | |
|---|---|---|---|---|
| | | PARTITION #1 | PARTITION #2 | PARTITION #3 |
| NODE | NODE A | 80 | | 60 |
| | NODE B | 80 | 100 | |
| | NODE C | | 90 | 60 |

FIG. 3

| CURRENT-ROLE TABLE | | PARTITION | | |
|---|---|---|---|---|
| | | PARTITION #1 | PARTITION #2 | PARTITION #3 |
| NODE | NODE A | OWNER | NONE | BACKUP |
| | NODE B | BACKUP | OWNER | NONE |
| | NODE C | NONE | NONE | OWNER |

FIG. 4

| NEXT-ROLE TABLE | | PARTITION | | |
|---|---|---|---|---|
| | | PARTITION #1 | PARTITION #2 | PARTITION #3 |
| NODE | NODE A | OWNER | NONE | BACKUP |
| | NODE B | BACKUP | OWNER | NONE |
| | NODE C | NONE | NONE | OWNER |

FIG. 5

| TARGET-ROLE TABLE | | PARTITION | | |
|---|---|---|---|---|
| | | PARTITION #1 | PARTITION #2 | PARTITION #3 |
| NODE | NODE A | MID-BACKUP | | MID-BACKUP |
| | NODE B | MID-BACKUP | MID-BACKUP | |
| | NODE C | | MID-BACKUP | MID-BACKUP |

FIG. 6

$$\text{Minimize}_{A_{p,s}^t} : \alpha o_{mcost} - (1-\alpha) o_{margin}$$

$$\text{Subject to}: o_{margin} = \min_{s \in S} \left[ f(|\{p \in P \mid A_{p,s}^t = 1\}|) - \sum_{p \in P} A_{p,s}^t r_p^t \right]$$

$$o_{mcost} = \max_{s \in S} \left[ \sum_{p \in P} |A_{p,s}^t - A_{p,s}^{t-1}| m_p^t c^t \right]$$

$$o_{margin} \geq 0$$

$$o_{mcost} \leq T$$

$$\sum_{s \in S} A_{p,s}^t = k$$

$$\sum_{p \in P} A_{p,s}^t m_p^t \leq M_s$$

FIG. 14

Minimize $t_\delta$ (1)

Subject to: $y_{rt} = \sum_{\gamma=max\{t-r_t+1,1\}}^{t} X r \gamma, \ r \in R, t \in T$ (2)

$\sum_{t \in T} x_{rt} = 1, \quad r \in R$ (3)

$x_{r0} = 1, \quad r \in R$ (4)

$u_{n0} = U_{n0}, \quad n \in N$ (5)

$u_{nt} = U_{n,t-1} + \sum_{r \in R, n=d_r} y_{rt} \frac{m_r}{t_r} - \sum_{r \in R, n=s_r} x_{r,max\{t-t_r,0\}} m_r, \ n \in N, t \in T_3$ (6)

$u_{nt} \le C_n, \quad n \in N, t \in T$ (7)

$\sum_{r \in R} y r_t \frac{m_r}{t_r} \le W_0, \quad t \in T$ (8)

$\sum_{r \in R, n=d_r} y_{rt} \frac{m_r}{t_r} \le W_n, \quad t \in T, n \in N$ (9)

$\sum_{t \in T} t x_{rt} + t_r \le t_\delta, \quad r \in R$ (10)

FIG. 17

| PARTITION ROLE | PARTITION NUMBER | SOURCE NODE NUMBER: SYSTEM PORT NUMBER | DESTINATION NODE NUMBER: SYSTEM PORT NUMBER | START TIME | END TIME |
|---|---|---|---|---|---|
| OWNER | 0 | 192.168.56.1: 10150 | 192.168.56.5: 10150 | 2019/07/09 10:01:00 | 2019/07/09 10:30:59 |
| OWNER | 1 | 192.168.56.2: 10150 | 192.168.56.6: 10150 | 2019/07/09 10:01:00 | 2019/07/09 10:59:59 |
| BACKUP | 0 | 192.168.56.3: 10150 | 192.168.56.7: 10150 | 2019/07/09 10:31:00 | 2019/07/09 10:59:59 |
| BACKUP | 1 | 192.168.56.4: 10150 | 192.168.56.8: 10150 | 2019/07/09 11:01:00 | 2019/07/09 11:59:59 |

FIG. 18

CALCULATING DEVICE, DATA BASE SYSTEM, CALCULATION SYSTEM, CALCULATION METHOD, AND STORAGE MEDIUM

CROSS-REFERENCE TO RELATED APPLICATIONS

This application is based upon and claims the benefit of priority from Japanese Patent Application No. 2019-005415, filed on Jan. 16, 2019; and Japanese Patent Application No. 2019-210374, filed on Nov. 21, 2019; the entire contents of which are incorporated herein by reference.

FIELD

Embodiments described herein relate generally to a calculating device, a data base system, a calculation system, a calculation method, and a storage medium.

BACKGROUND

There is a database system that splits a database into multiple partitions and stores the database in multiple nodes. It is desirable for the placement of the multiple partitions of the database system to be robust for fluctuation of the processing load, etc.

BRIEF DESCRIPTION OF THE DRAWINGS

FIG. 3 is a drawing illustrating an example of a data retention table;

FIG. 4 is a drawing illustrating an example of a current-role table;

FIG. 5 is a drawing illustrating an example of a next-role table;

FIG. 6 is a drawing illustrating an example of a target-role table;

FIG. 14 is a figure illustrating an example of the formulated mixed-integer linear programming problem;

FIG. 17 is a figure illustrating an example of the formulated integer linear programming problem;

FIG. 18 is an output example of the calculating device according to the embodiment.

DETAILED DESCRIPTION

Figure 1:
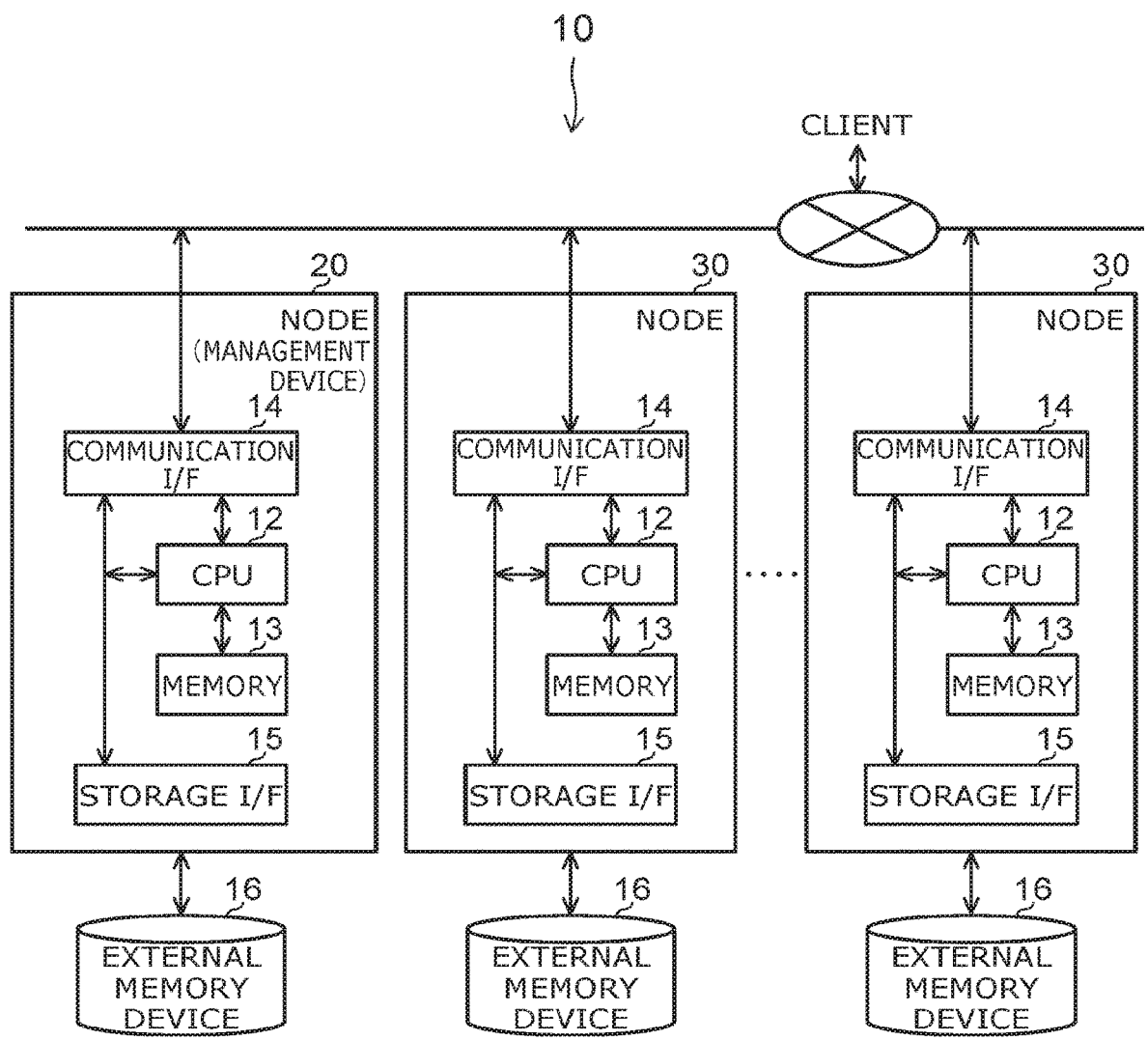
FIG. 1 is a drawing illustrating the hardware configuration of a database system to which a calculating device according to an embodiment is applied.

According to one embodiment, a calculating device performs at least a calculation for a database system. A database of the database system is split into a plurality of partitions and placed in a plurality of nodes. The device is configured to accept statistical information relating to the plurality of partitions and the plurality of nodes and being collected by the plurality of nodes, and generate fluctuation information by using the statistical information and perturbation information. The perturbation information corresponds to statistical fluctuation of the statistical information. The device is configured to calculate a placement of the plurality of partitions in the plurality of nodes by using the statistical information and the fluctuation information. The placement is capable of improving a performance of the database system.

Various embodiments are described below with reference to the accompanying drawings.

In the specification and drawings, components similar to those described previously are marked with like reference numerals, and a detailed description is omitted as appropriate.

FIG. 1 is a drawing illustrating the hardware configuration of a database system to which a calculating device according to an embodiment is applied.

The database system 10 receives an access request (e.g., refer, update, or register) for the database via a network from a client which is an external computer. The database system 10 performs processing corresponding to the received access request.

The database system 10 includes multiple nodes 30 (database nodes). The multiple nodes 30 are connected to each other via the network. In other words, the database system 10 has a shared-nothing configuration.

In the database system 10, data sets are distributed in the multiple nodes 30. The database system 10 is accessed as one database by the client which is an external computer.

The database system 10 includes, for example, a simple data model made of pairs of keys and values. In the database system 10, the key-value database may be distributed by being sharded using the keys. Sharding is the technology of splitting the data into smaller data and automatically distributing and storing the data in multiple nodes. In other words, the database system 10 may be a distributed key-value database.

By generating the database system 10 by applying a distributed key-value database to a shared-nothing database system, scaling out and increasing the scale of the database system 10 are easy.

Hardware-wise, the nodes 30 are mutually-independent computers. Each node 30 can independently accept access requests from the client and can independently perform processing corresponding to the access requests.

As an example, each node 30 includes a CPU (Central Processing Unit) 12, memory 13, a communication I/F 14, and a storage I/F 15. Each node 30 is connected to an external memory device 16 via the storage I/F 15. The external memory device 16 may be provided inside the node 30.

The database system 10 stores the database by splitting into a plurality by partitioning. Partitioning is technology in which the database is split into a plurality; and the split data sets (called partitions) are stored by being distributed into multiple nodes. By applying partitioning, the data set that is stored in each node can be small. Thereby, the access from the client can be distributed in multiple nodes. The number of partitions is predetermined. The method for splitting the database is arbitrary.

In each node 30, a role is assigned to each partition. The role is one of owner, backup, or "none." "None" means that neither role of owner or backup is performed.

For example, in one of the multiple partitions, the role of owner is assigned to one of the multiple nodes 30. In another one of the multiple partitions, the role of owner is assigned to one of the multiple nodes 30. In the one of the multiple partitions, the one of the multiple nodes 30 having the role of owner assigned may be different from the other one of the multiple nodes 30 having the role of owner assigned in the other one of the multiple partitions.

Similarly, in one of the multiple partitions, the role of backup is assigned to one or more of the multiple nodes 30. In another one of the multiple partitions, the role of backup is assigned to one or more of the multiple nodes 30. In the one of the multiple partitions, the one or more of the multiple nodes 30 having the role of backup assigned may be different from the other one or more of the multiple nodes 30 having the role of backup assigned in the other one of the multiple partitions.

The owner stores the data set of the corresponding partition. The owner accepts and processes the access requests from the client for the data set of the corresponding partition. The backup stores the data set of the corresponding partition. For example, the backup is a backup of the owner such that the backup performs the role instead of the owner when a failure occurs in the owner. By assigning the backup, the service can be continued using the node of the backup even when a failure occurs in the node of the owner. The owner and the backup are also called respectively master and slave.

By mutual communication, the multiple nodes 30 elect any one node 30 as a management device 20. The one elected node 30 functions as the management device 20.

For example, the multiple nodes 30 elect the one management device 20 by using a prescribed algorithm at the startup of the database. When the node 30 already elected can no longer function as the management device 20 due to a failure, the multiple nodes 30 elect a new node 30 as the management device 20 by using the prescribed algorithm.

In the drawings and the description, the management device 20 may be illustrated or described separately from the nodes 30 for convenience. However, the management device 20 simultaneously performs the operation of a normal node 30. In other words, the elected node 30 simultaneously accepts the access requests from the client and performs the processing corresponding to the access requests.

The management device 20 manages the multiple nodes 30. For example, the management device 20 assigns the nodes 30 that are owners and the nodes 30 that are backups for each partition.

The management device 20 assigns the nodes 30 to be backups based on a predetermined redundancy. The redundancy refers to the number of nodes functioning as backups. As an example, the redundancy is set to 2 or 3.

In the database system 10, when a failure occurs in any node 30, the node 30 in which the failure occurred can be isolated. Also, the performance of the database can be improved by newly adding a node 30 to the database system 10.

Figure 2:
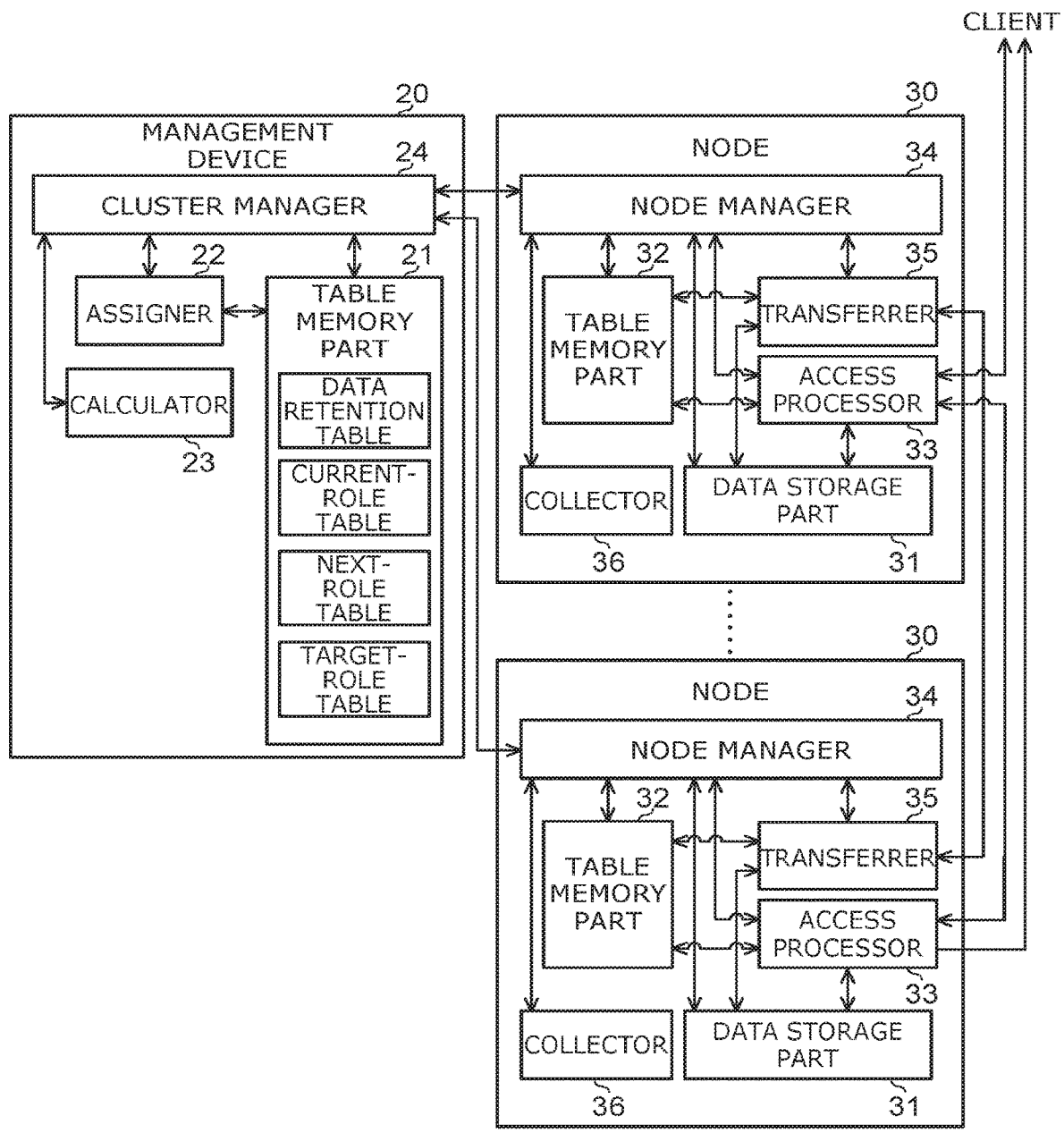
FIG. 2 is a drawing illustrating the functional configuration of the database system to which the calculating device according to the embodiment is applied.

FIG. 2 is a drawing illustrating the functional configuration of the database system 10 to which the calculating device according to the embodiment is applied.

The management device 20 includes a table memory part 21, an assigner 22, a calculator 23, and a cluster manager 24. The assigner 22, the calculator 23, and the cluster manager 24 are realized by the CPU 12 of the management device 20 executing a program. At least one of the assigner 22, the calculator 23, or the cluster manager 24 may be realized by hardware circuitry. The table memory part 21 is realized by the external memory device 16 or the memory 13 of the management device 20.

FIG. 3 is a drawing illustrating an example of a data retention table.

FIG. 4 is a drawing illustrating an example of a current-role table.

FIG. 5 is a drawing illustrating an example of a next-role table.

FIG. 6 is a drawing illustrating an example of a target-role table.

The table memory part 21 stores a data retention table, a current-role table, a next-role table, and a target-role table.

The data retention table stores the timestamp of each node 30 in each partition. The timestamp shows the update history of the data set of the corresponding partition stored in the corresponding node 30. As an example, the timestamp is a value that is incremented each time the data set is updated. Accordingly, the node 30 that has the largest timestamp in some partition means that the node 30 stores the newest data set of that partition.

For example, as illustrated in FIG. 3, the data retention table includes rows designating the nodes 30 and columns designating the partitions. Each cell of the data retention table stores the timestamp of the data set of the partition designated by the column stored in the node 30 designated by the row.

The current-role table stores the role in the database assigned to each node 30 in each partition. Specifically, the current-role table stores the role of each node 30 in each partition.

For example, as illustrated in FIG. 4, the current-role table includes rows designating the nodes 30 and columns designating the partitions. Each cell of the current-role table stores the role assigned to the node 30 designated by the row in the partition designated by the column. In the drawings, the assignment of the role of owner is recited as "OWNER" or "O." The assignment of the role of backup is recited as "BACKUP" or "B." Not being assigned to be an owner or a backup is recited as "NONE" or "N," or is blank.

The next-role table stores the next role to be assigned to each node 30 in each partition. The next role to be assigned is one of owner, backup, or "none." For example, the current-role table is replaced with the next-role table when a failure occurs in the node 30 or when a new node 30 is added.

For example, as illustrated in FIG. 5, the next-role table includes rows designating the nodes 30 and columns designating the partitions. Each cell of the next-role table stores the next role assigned to the node 30 designated by the row in the partition designated by the column.

The target-role table stores the role of backup candidate assigned to each node 30 in each partition. The backup candidate is the role of the node 30 preparing to perform the role of owner or backup in the partition. The node 30 that is assigned to be a backup candidate may become an owner.

For example, as illustrated in FIG. 6, the target-role table includes rows designating the nodes 30 and columns designating the partitions. Each cell of the target-role table stores the role of backup candidate assigned to the node 30 designated by the row in the partition designated by the column. In the drawings, "MID-BACKUP" or "M" shows that the role of backup candidate is assigned. A blank cell shows that the cell is not assigned to be a backup candidate.

The assigner 22 assigns the nodes 30 that are owners and the nodes 30 that are backups in each partition. The assignment is performed according to the modification of the status of each node 30. For example, when a failure occurs in any node 30, the assigner 22 reassigns the nodes 30 that are owners and the nodes 30 that are backups other than the node 30 in which the failure occurred.

When a new node 30 is added, the assigner 22 reassigns, in each partition, the nodes 30 that are owners and the nodes 30 that are backups including the new node 30.

When the sending of the data sets to the nodes 30 assigned to be backup candidates is completed, nodes 30 newly arise that can be owners or backups. At this time, the assigner 22 reassigns the nodes 30 that are owners and the nodes 30 that are backups in each partition.

The assigner 22 assigns the roles to the nodes 30 so that at least an owner exists in each partition. Also, the assigner 22 assigns the nodes 30 that are owners and the nodes 30 that are backups in each partition so that the redundancy is within the predetermined range. The assignment is performed to meet the condition of at least the database functioning. Thereby, even when a failure occurs in any node 30, the likelihood of at least the database being able to function can be increased.

The assigner 22 assigns the nodes 30 that are owners and the nodes 30 that are backups in each partition so that owners and backups are distributed in the nodes 30. The assignment is performed to meet the condition of at least the database functioning and the redundancy being within the predetermined range. Thereby, the assigner 22 can cause the processing load to be uniform between the nodes 30.

The calculator 23 calculates the data placement. The data placement is calculated so that the requests from the client can be processed more efficiently by the multiple nodes 30, and so that no failure occurs in any node 30. The processing by the calculator 23 is described below.

In the example of FIG. 2, the management device 20 is included as the calculator 23 for the function of the calculating device according to the embodiment. In other words, the management device 20 functions also as the calculating device. Other than the example of FIG. 2, the calculating device according to the embodiment may be a computer connected to the management device 20 and the multiple nodes 30 via a network. Here, the case is described where the management device 20 includes the function as the calculating device.

The cluster manager 24 exchanges messages with the nodes 30 via the network. The cluster manager 24 manages the nodes 30 based on the messages. For example, the cluster manager 24 exchanges a message called a heartbeat with each node 30 every constant amount of time. When there is no heartbeat reply from any node 30, the cluster manager 24 determines that a failure has occurred in that node 30.

The cluster manager 24 regularly receives a data retention table from each node 30. The cluster manager 24 collectively stores the data retention tables received from all of the nodes 30 in the table memory part 21. When the data retention table cannot be received from any node 30, the cluster manager 24 determines that a failure has occurred in that node 30.

At the startup, the cluster manager 24 causes the assigner 22 to calculate the next-role table. The cluster manager 24 distributes the calculated next-role table to each node 30. This distribution provides the nodes 30 with the instructions for the operations corresponding to the assigned roles.

The cluster manager 24 regularly causes the assigner 22 to calculate the next-role table. When the calculated next-role table has changed from the current-role table, the cluster manager 24 distributes the calculated next-role table to each node 30. This distribution provides the nodes 30 with the instructions for the operations corresponding to the newly-assigned roles. After distributing the next-role table, the cluster manager 24 updates the current-role table stored in the table memory part 21 to the content of the next-role table.

For example, the next-role table that is calculated by the assigner 22 is different from the current-role table when a failure occurs in any node 30, when a new node 30 is added, or when a node 30 becomes assignable as a backup. As described above, a node 30 assigned to be a candidate becomes assignable as a backup when the sending of the data set to the node 30 is completed. The cluster manager 24 distributes the changed next-role table to each node 30.

The node 30 includes a data storage part 31, a table memory part 32, an access processor 33, a node manager 34, a transferrer 35, and a collector 36. The access processor 33, the node manager 34, and the transferrer 35 are realized by the CPU 12 of the node 30 executing a program. At least a part of the access processor 33, the node manager 34, and the transferrer 35 may be realized by hardware circuitry. The data storage part 31 and the table memory part 32 are realized by the external memory device 16 or the memory 13 of the node 30.

Figure 7:
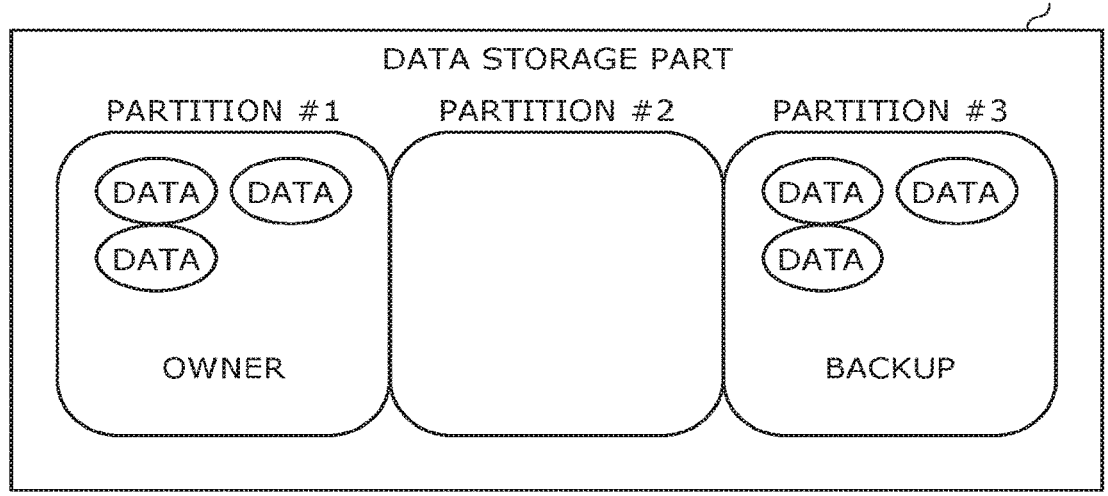
FIG. 7 is a drawing illustrating an example of data sets stored in the data storage part.

FIG. 7 is a drawing illustrating an example of data sets stored in the data storage part.

The data storage part 31 stores data sets of partitions having nodes assigned to be owners or backups by the current-role table. For example, in partitions #1 to #3 which are split into three as illustrated in FIG. 7, a node of the partitions #1 to #3 is assigned to be an owner in the partition #1 and assigned to be a backup in the partition #3. The data storage part 31 stores the data sets of the partition #1 and the partition #3.

The node 30 that is in a partition assigned to be a backup candidate by the target-role table receives a data set from the node 30 in a partition assigned to be an owner. The data storage part 31 stores at least a part of the data set received from the owner node 30.

The table memory part 32 stores a part of the data retention table corresponding to it's own nodes. The table memory part 32 stores the current-role table, the next-role table, and the target-role table. The current-role table is rewritten with the content of the next-role table when the next-role table is received. The target-role table is rewritten with the content of a regularly-received target-role table when the content of the received target-role table has changed.

The access processor 33 receives the access requests from the client via the network. The access processor 33 performs the processing corresponding to the roles of the nodes of each partition assigned by the current-role table.

Specifically, the access processor 33 accepts the access requests from the client for the partitions assigned to be owners by the current-role table. The access processor 33 performs the processing corresponding to the access requests. For example, when accepting a reference request, the access processor 33 reads and sends, to the client, the corresponding data among the data sets of the partitions. When accepting an update request, the access processor 33 updates the corresponding data in the data sets of the partitions. When accepting a registration request, the access processor 33 registers new data in the data sets of the partitions.

The access processor 33 may accept a transaction including a series of access requests. The access processor 33 performs the series of access requests from the client by performing transaction processing.

Figure 8:
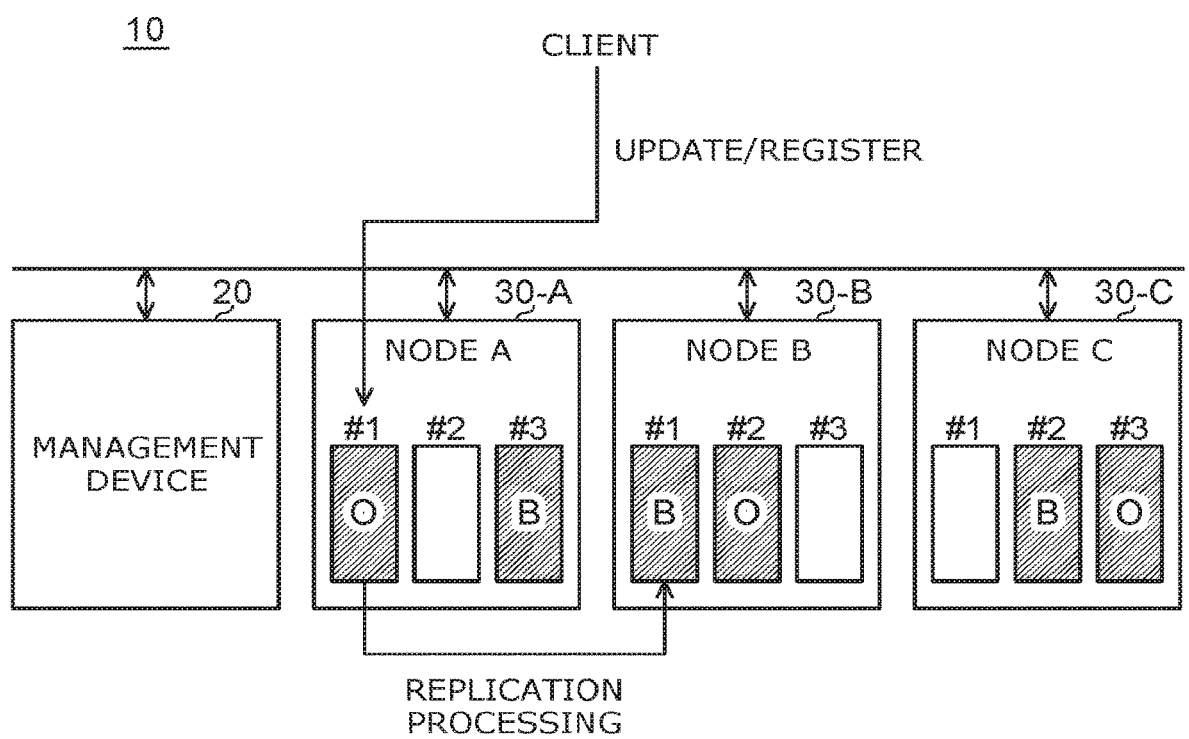
FIG. 8 is a drawing for describing replication processing.

FIG. 8 is a drawing for describing replication processing.

When processing an update request or a registration request, the access processor 33 performs replication processing to a node 30 of the partition assigned to be a backup by the current-role table. The replication processing is processing for generating, in the node 30 assigned to be a backup, a replica (a duplicate) of the data set stored in a node 30 assigned to be an owner.

Specifically, as shown in FIG. 8, when accepting the request of update or register for a partition having a node assigned to be an owner, the access processor 33 sends the same access request to another node 30 assigned to be a backup. The access processor 33 of the other node 30 accepts, for the partition assigned to be a backup, the request of update or register from the node 30 assigned to be an owner. The access processor 33 of the other node 30 performs the processing of update or register corresponding to the request.

By the replication processing, the access processor 33 can synchronize the data sets between the node 30 assigned to be the owner and the node 30 assigned to be the backup.

When performing the replication processing, the access processor 33 of the node 30 assigned to be the owner may send a transaction including a series of access requests. The access processor 33 of the node 30 assigned to be the backup performs the replication processing by performing transaction processing.

When processing the update request or the registration request, the access processor 33 updates the timestamps of the corresponding partition in the data retention table stored in the table memory part 32.

Figure 9:
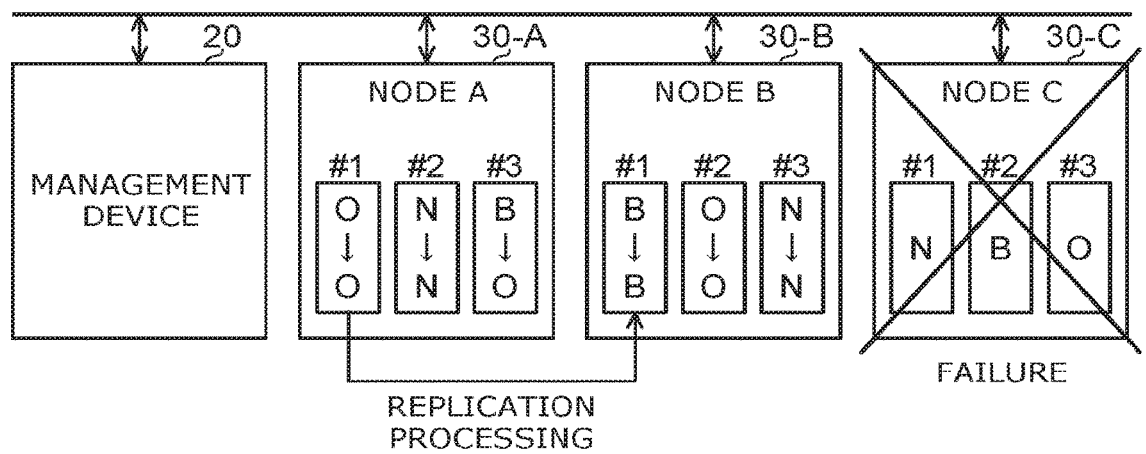
FIG. 9 is a drawing for describing short-term synchronous processing.

FIG. 9 is a drawing for describing short-term synchronous processing.

The node manager 34 exchanges messages with the cluster manager 24 of the management device 20 via the network. According to the message called the heartbeat received from the cluster manager 24, the node manager 34 sends a response message if a failure has occurred in one of it's nodes. The node manager 34 regularly sends the data retention table stored in the table memory part 32 to the cluster manager 24.

The node manager 34 receives the next-role table from the cluster manager 24 and stores the received next-role table in the table memory part 32. When receiving the next-role table, the node manager 34 performs short-term synchronous processing. As illustrated in FIG. 9, the short-term synchronous processing is performed to cause the nodes 30 to operate in the roles assigned by the next-role table. The short-term synchronous processing is performed by temporarily discontinuing the processing corresponding to access requests from the client.

Specifically, to cause the nodes 30 in the partitions to operate in the roles of the next-role table, the node manager 34 causes the access processor 33 to perform processing similar to the replication processing. Thereby, in each partition, the data sets are synchronized between the nodes 30 assigned to be owners and the nodes 30 assigned to be backups. After synchronizing the data sets, the node manager 34 causes the access processor 33 to perform the processing corresponding to the new roles of the partitions assigned by the next-role table.

When the short-term synchronous processing is completed, the node manager 34 updates the content of the current-role table to the content of the next-role table. Thereafter, the access processor 33 can accept the access requests from the client.

The node manager 34 regularly receives the target-role table from the cluster manager 24 and stores the received target-role table in the table memory part 32.

Figure 10:
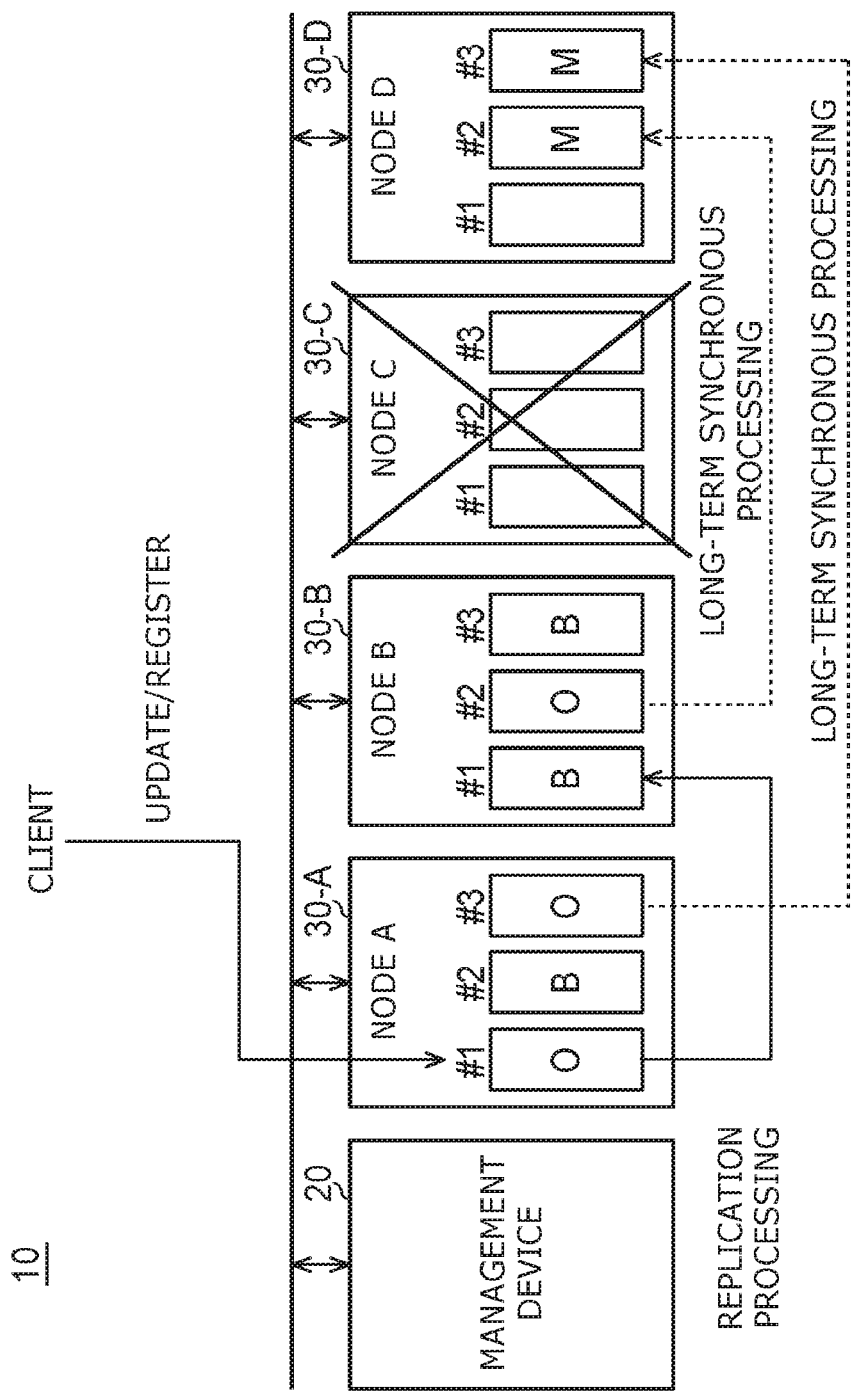
FIG. 10 is a drawing for describing long-term synchronous processing.

FIG. 10 is a drawing for describing long-term synchronous processing.

The transferrer 35 performs the long-term synchronous processing. As illustrated in FIG. 10, the long-term synchronous processing is performed by causing the nodes 30 to operate in roles assigned by the target-role table. The long-term synchronous processing is performed without discontinuing the processing for the access requests from the client. Specifically, the transferrer 35 sends the data set of a partition to another node 30. The data set that is sent is the data set of a partition having a node assigned to be an owner by the current-role table. The other node 30 is a node 30 assigned to be a backup candidate by the target-role table but not assigned to be an owner or a backup by the current-role table. This processing is performed without discontinuing the processing for the access requests.

The transferrer 35 receives a data set of a partition from another node 30. The received data set is the data set of a partition having a node assigned to be a backup candidate by the target-role table but not assigned to be an owner or a backup by the current-role table. The other node 30 is a node 30 assigned to be an owner by the current-role table. This processing is performed without discontinuing the processing for the access request.

By performing the long-term synchronous processing, the transferrer 35 can store a replica of a data set stored in a node 30 assigned to be an owner in a node 30 not assigned to be an owner or a backup. Thereby, the transferrer 35 can newly generate a node 30 that can be an owner or a backup after the long-term synchronous processing.

When performing the long-term synchronous processing, the transferrer 35 sends the data set of a partition assigned to be an owner to a node 30 assigned to be a backup candidate. This processing is performed in the background so that the transactions performed by the access processor 33 are not obstructed. The transferrer 35 receives the data set of the partition assigned to be the backup candidate from the node 30 assigned to be the owner in the background.

As an example, when the node 30 includes multiple CPUs 12, the background processing is performed using a part of the CPUs 12 not performing the transaction processing. As another example, when the CPU 12 performs time-division processing, the background processing is performed in a part of the time period when the CPU 12 is not performing the transaction processing. Thereby, the transferrer 35 can perform the long-term synchronous processing while suppressing the decrease of the response speed to the access requests from the client, etc.

The transferrer 35 may send a data set of a partition to another node 30. The data set that is sent is the data set of a partition having a node assigned to be a backup in the current-role table. The other node 30 is a node 30 assigned to be a backup candidate by the target-role table but not assigned to be an owner or a backup. This processing is performed on the condition that the same data set is not sent from the other node 30.

Figure 11:
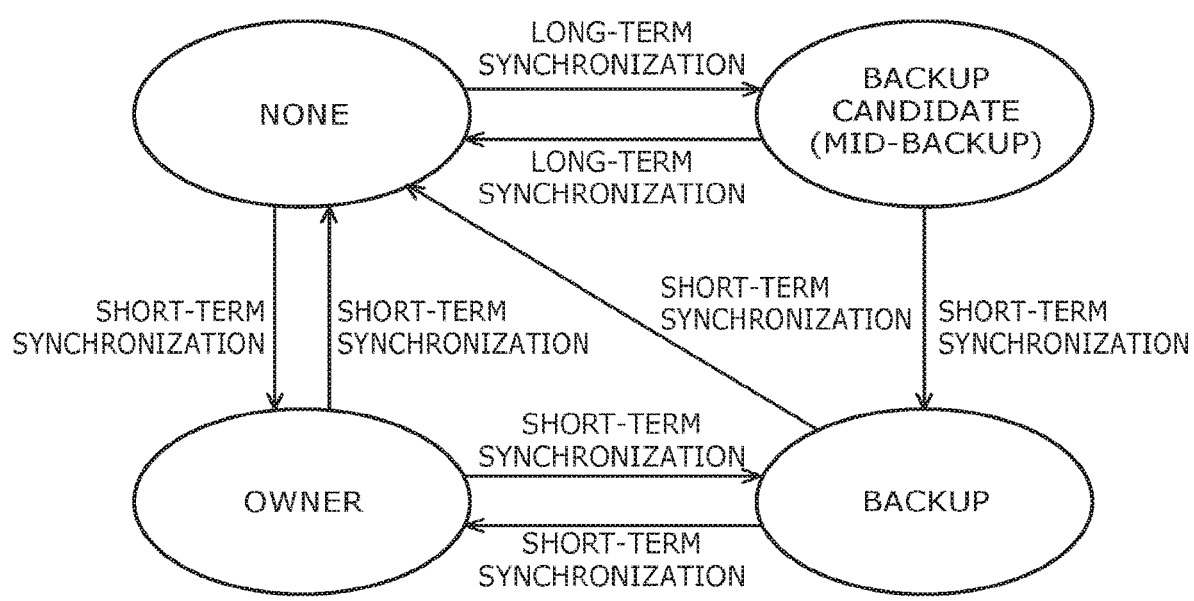
FIG. 11 is a drawing illustrating transitions of the roles assigned to the node.

FIG. 11 is a drawing illustrating transitions of the roles assigned to the node 30.

In each partition, the node 30 transitions to a state in which "owner," "backup," or "backup candidate" is assigned, or the "none" state in which no role is assigned.

The node 30 transitions mutually between the "none" state and the "owner" state by short-term synchronous processing.

The node 30 transitions mutually between the "owner" state and the "backup" state by short-term synchronous processing. The node 30 transitions from the "backup" state to the "none" state by short-term synchronous processing.

The node 30 transitions mutually between the "none" state and the "backup candidate" state by long-term synchronous processing. The node 30 transitions from the "backup candidate" state to the "backup" state by short-term synchronous processing.

For example, the operations recited in international publication WO 2015/029139 are applicable to the more specific operations of the components described above.

Figure 12:
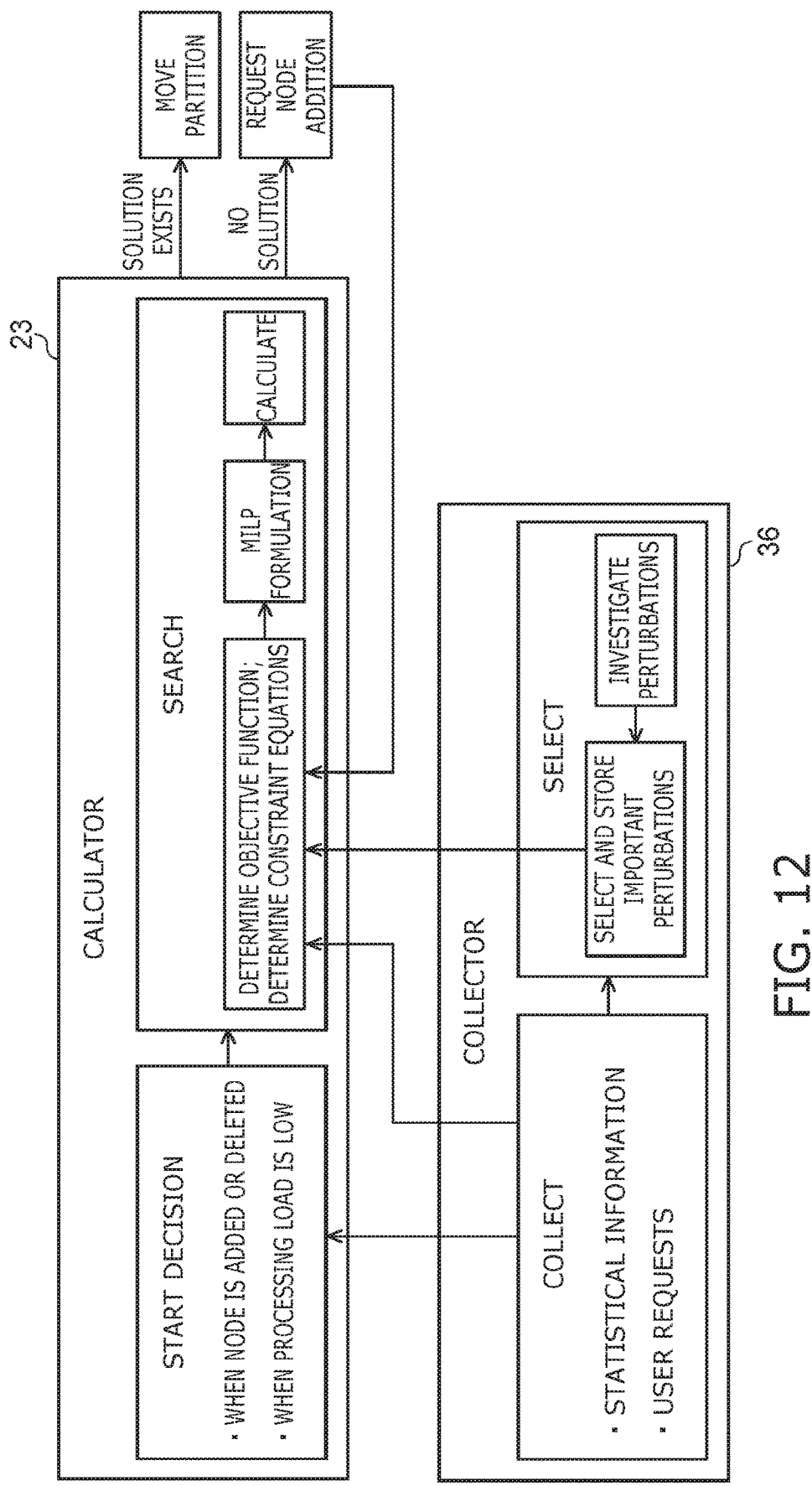
FIG. 12 is a drawing illustrating the functional configuration of the database system according to the embodiment.

FIG. 12 is a drawing illustrating the functional configuration of the database system according to the embodiment.

As illustrated in FIG. 12, mainly, the calculator 23 performs a search of the data placement and a start decision of the search. The collector 36 performs the collection of information and the selection of perturbation information.

When the collector 36 performs the collection of the information and the selection of the perturbation information, information is sent from the node manager 34 to the cluster manager 24. When deciding to start the search, the calculator 23 searches for a data placement using the sent information.

The placement of the multiple partitions is calculated so that by searching for the data placement, the performance of the database system 10 can be improved further; and the database system 10 can be more robust.

The collection of the information will now be described.

The collector 36 collects statistical information relating to it's own node 30 and the multiple partitions stored by it's own node 30. The statistical information is used in the calculations by the calculator 23. The statistical information includes, for example, the access frequency of it's own node 30 to each partition, the size of it's own node 30 in each partition, the movement time per unit data size between it's own node 30 and the other nodes 30, and the capacity (the throughput) of it's own node 30. The collector 36 collects the statistical information every constant amount of time.

For example, the access frequency of it's own node 30 to a partition p at a time t is taken as $r^t_p$. The data size of the partition p of it's own node 30 at the time t is taken as $m^t_p$. The time necessary to move the unit data size of the partition between the nodes 30 at the time t is taken as $c^t$. For example, the collector 36 collects the statistical information at the time t as a vector $v^t=(r^t_1, r^t_2, \ldots, r^t_p, m^t_1, m^t_2, \ldots, m^t_p, c^t)$.

The collector 36 uses the number of requests from the client that can be processed per unit time by it's own node 30 without delay as the capacity. The collector 36 determines that the processing is without delay when the requests from the client can be processed within a preset time. From the statistical information of the capacity, the collector 36 estimates a capacity function of the relationship between the capacity and the number of partitions of it's own node 30.

Figure 13:
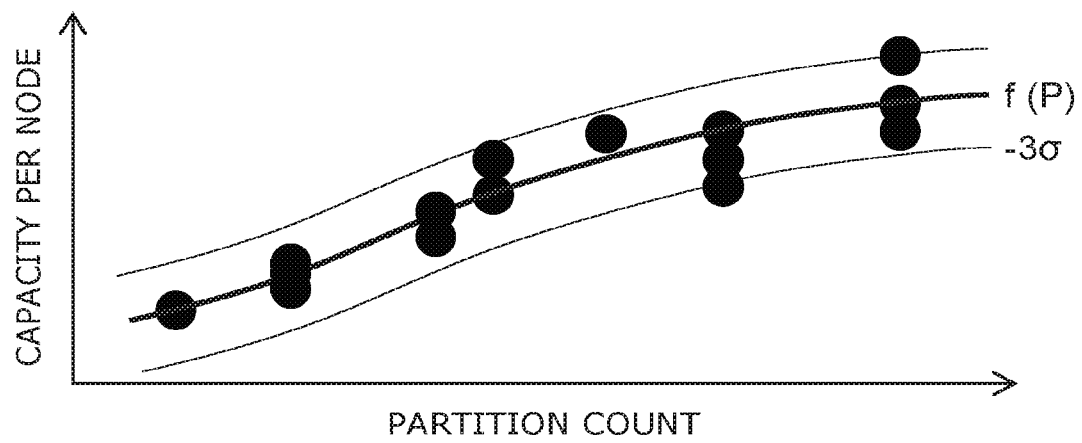
FIG. 13 is a figure illustrating an example of observation results of the capacity.

FIG. 13 is a figure illustrating an example of observation results of the capacity.

In FIG. 13, the horizontal axis is the number of partitions stored in one node 30. The vertical axis is the capacity of one node 30. As illustrated in FIG. 12, the collector 36 collects the number of partitions and the observed value of the capacity of it's own node 30 every constant amount of time. Typically, the capacity of the node 30 also improves as the number of partitions stored in one node 30 increases. This is because as the number of partitions in one node 30 increases, the movement amount of the data between the multiple nodes 30 is reduced when merging the data of the multiple partitions.

Based on the observed values, the collector 36 estimates the capacity function f(P) of the relationship between the capacity and the number of partitions of it's own node 30. For example, the collector 36 estimates the capacity function f(P) by performing regression analysis of the number of partitions and the observed values of the capacity by using a kernel method.

At least one of the multiple nodes 30 includes a function of accepting a user request. When the node 30 that includes this function accepts user requests sent from an external client, the collector 36 of the node 30 also collects the user requests in addition to the statistical information.

The user request includes a tolerable time for performing the placement of the multiple partitions. The tolerable time includes, for example, an end time predesignated by the user. For example, the calculator 23 calculates the placements performable within the designated end time. The tolerable time may include the start time and the end time. The calculator 23 calculates the placements performable from the start time to the end time.

The user request further includes the execution timing and the replica count (the redundancy). The execution timing includes a condition for starting the calculation of the placement of the multiple partitions. For example, the execution timing may be set to be when a node is added or deleted or when the processing load is low. The start time that is included in the tolerable time may be used as the execution timing.

For example, the collector 36 sends, to the calculator 23, only the execution timing included in the user request at the startup of the database system 10 or at a prescribed timing. When the condition of the execution timing is satisfied, the calculator 23 decides to start the search for the data placement.

The selection of the perturbation information will now be described.

The collector 36 generates the perturbation information from the statistical information. The perturbation information corresponds to the statistical fluctuation included in the statistical information. For example, as illustrated in FIG. 13, the collector 36 calculates the variance σ when estimating the capacity function f(P). An integer multiple (e.g., 3 times) of the variance σ is used as the perturbation information. Similarly, the collector 36 respectively generates the perturbation information corresponding to the fluctuation of the access frequencies to the partitions, the fluctuation of the data sizes of the partitions, and the fluctuation of the movement time per unit data size.

The collector 36 generates the perturbation information by using the statistical information each time the statistical information is collected. For example, the collector 36 stores a preset number (threshold) of the multiple perturbation information. The collector 36 thins (erases) a part of the multiple perturbation information when the number of the generated multiple perturbation information is more than a threshold.

The time, the magnitude of the fluctuation, or the like is used as the condition for thinning. For example, the collector 36 thins in order from the perturbation information having older times. The collector 36 may thin by calculating the size of each perturbation information and by thinning relatively small perturbation information. As a result, the perturbation information that is newer and has poorer conditions is selected and stored.

The node manager 34 sends the statistical information, the perturbation information, and the user request to the cluster manager 24. The cluster manager 24 receives the statistical information, the perturbation information, and the user request sent from the multiple nodes 30. When deciding to start the search, the calculator 23 calculates the placement of the multiple partitions of the multiple nodes 30 based on the statistical information, the perturbation information, and the user request.

The calculator 23 generates fluctuation information by using the statistical information and the perturbation information. For example, the collector 36 generates the fluctuation information by adding or subtracting the perturbation information of one type to or from the statistical information of the one type. The fluctuation information is generated so that the conditions are poorer than those of the statistical information actually observed.

The calculator 23 calculates the placement of the multiple partitions based on the statistical information and the fluctuation information. The fluctuation information is generated so that the evaluation value of the placement of the multiple partitions based on the fluctuation information is poorer than the evaluation value of the placement of the multiple partitions based on the statistical information.

For example, as illustrated in FIG. 13, the calculator 23 uses, as the fluctuation information, the value of $3\sigma$ as the perturbation information subtracted from the capacity function $f(P)$ as the statistical information. In other words, the capacity at each partition count is lower for the fluctuation information than for the statistical information.

Similarly, the calculator 23 generates fluctuation information relating to the access frequency to each partition by adding perturbation information corresponding to the fluctuation of the access frequency to the statistical information relating to the access frequency. The calculator 23 generates fluctuation information relating to the size of each partition by adding perturbation information corresponding to the fluctuation of the size to the statistical information relating to the size. The calculator 23 generates fluctuation information relating to the movement time by adding perturbation information corresponding to the fluctuation of the movement time to the statistical information of the movement time per unit data size.

Based on the statistical information and the fluctuation information, the calculator 23 calculates the placement so that the database system 10 can be more robust. Specifically, the calculator 23 formulates the placement of the multiple partitions as a mixed-integer linear programming problem (MILP). By using the statistical information and the fluctuation information, the calculator 23 solves the MILP multiple times and searches for a more robust placement of the multiple partitions.

The calculator 23 solves the formulated MILP by using a solver. For example, CPLEX (registered trademark), Gurobi (registered trademark), etc., can be used as the solver.

FIG. 14 is a figure illustrating an example of the formulated mixed-integer linear programming problem.

For example, the MILP is formulated as illustrated in FIG. 14. A more robust placement of the multiple partitions is searched by solving these formulas. In FIG. 14, f is the capacity of each node. P is the set of the multiple partitions. p is one of the multiple partitions. S is the set of the multiple nodes. s is one of the multiple nodes. t is the time step. T is the tolerable time for the movement of the partition. $M_s$ is the maximum usable memory size of each node. $m^t_p$ is the memory size of the partition p. $c^t$ is the movement time per unit size of each partition. k is the replica count. $o_{mcost}$ is the maximum movement cost between the multiple nodes. $o_{margin}$ is the minimum margin of the capacity of the multiple nodes. $A^t_{p,s}$ is a variable representing the movement of the partition p in the node. $A^t_{p,s}$ is "1" when the node storing the partition p changes before and after the placement modification of the multiple partitions. $A^t_{p,s}$ is "0" when the node storing the partition p does not change. $\alpha$ is a value preset by the user.

Here, it is taken that a distributed transaction occurs uniformly among the partitions. The proportion of the merged data amount is taken to be equal between the nodes 30. The performance is taken to be equal between the nodes 30. Also, the size is taken to be equal between the partitions.

In the formulas illustrated in FIG. 14, the placement of the multiple partitions is searched so that the value (the evaluation value) of the objective function represented using the maximum movement cost and the minimum margin is a minimum. The following constraints are set as constraint equations. No failures occur in any of the nodes 30 during the placement modification of the multiple partitions. In other words, the minimum margin does not fall below 0. The maximum movement cost does not exceed the tolerable time. The replica count of the user requests is generated even during the placement modification of the multiple partitions.

For example, the calculator 23 calculates the placement of the multiple partitions multiple times by performing the following first processing and second processing.

In the first processing, the calculator 23 fits parameters to the formulated MILP based on the statistical information. The calculator 23 solves the formulas having the fitted parameters by using a solver. Thereby, the placement (the initial placement) of the multiple partitions is calculated based on the statistical information. The calculator 23 temporarily uses the initial placement as the placement that is employed (the employed placement).

The calculator 23 generates the multiple fluctuation information by using the statistical information and the perturbation information. After generating the fluctuation information, the calculator 23 fits the multiple fluctuation information to the formulated MILP and extracts fluctuation information for which the evaluation value of the objective function is low. In other words, a candidate group P of the fluctuation information is generated by extracting the fluctuation information so that the conditions are poorer, e.g., the capacity of the node 30 is greatly inferior to the average value, the access frequency to each partition is greatly higher than the average value, etc.

The calculator 23 randomly extracts a part of the fluctuation information from the candidate group P. The calculator 23 respectively weights the data included in the extracted fluctuation information. Based on the weighted fluctuation information, the calculator 23 fits parameters to the formulated MILP and solves using a solver. Thereby, a placement candidate of the multiple partitions is calculated based on a part of the multiple fluctuation information.

The calculator 23 compares the evaluation value of the objective function when the multiple partitions are set to the initial placement and the evaluation value of the objective function when the multiple partitions are set to the placement candidate. When the evaluation value of the initial placement is better than the evaluation value of the placement candidate, the calculator 23 discards the placement candidate and does not modify the employed placement. When the evaluation value of the placement candidate is better than the evaluation value of the initial placement, the calculator 23 uses the placement candidate as the employed placement instead of the initial placement.

After the first processing recited above, the calculator 23 performs the following second processing. A part of the fluctuation information is extracted randomly. Similarly to the first processing, the calculator 23 respectively weights the data included in the extracted fluctuation information and fits parameters to the formulated MILP. The calculator 23 solves the formulas by using a solver to calculate an other placement candidate of the multiple partitions based on an other part of the multiple fluctuation information.

The calculator 23 compares the evaluation value of the objective function when the multiple partitions are set to the placement candidate and the evaluation value of the objective function when the multiple partitions are set to the other placement candidate. When the evaluation value of the placement candidate is better than the evaluation value of the other placement candidate, the calculator 23 discards the other placement candidate and does not modify the employed placement. When the evaluation value of the other placement candidate is better than the evaluation value of the placement candidate, the calculator 23 uses the other placement candidate as the employed placement instead of the placement candidate.

The calculator 23 repeats the second processing. For example, the number of repetitions is preset by the user. After repeating the second processing, the calculator 23 outputs, as the calculation result, the placement candidate maintained as the employed placement.

The cluster manager 24 sends the calculation result to the node manager 34 of each node 30. The transferrer 35 of each node 30 moves the multiple partitions between the multiple nodes 30 according to the calculation result. The placement of the multiple partitions calculated by the calculator 23 is realized thereby.

There are cases where the placement of the multiple partitions cannot be calculated when the constraints of the calculations by the calculator 23 are stringent. For example, the placement of the multiple partitions cannot be calculated when the tolerable time is too short, when the margin for the statistical fluctuation is too small, etc. For example, if the placement of the multiple partitions cannot be calculated even once when repeating the second processing, the calculator 23 outputs "no solution" as the result of the calculation. When the calculator 23 outputs "no solution," for example, information that indicates "no solution" and information that indicates a request to add a new node 30 is sent from any node 30 to the client. When "no solution" is output as the result of the calculation, the placement of the multiple partitions is not modified.

For example, when the user adds a new node 30 to the database system 10 according to the addition request, the calculator 23 recalculates the placement of the multiple partitions. When a placement of the multiple partitions is obtained from the calculation, the multiple partitions are moved according to the placement. When "no solution" is output as the result of the calculation, information that indicates a request to add a new node 30 is sent to the client.

Figure 15:
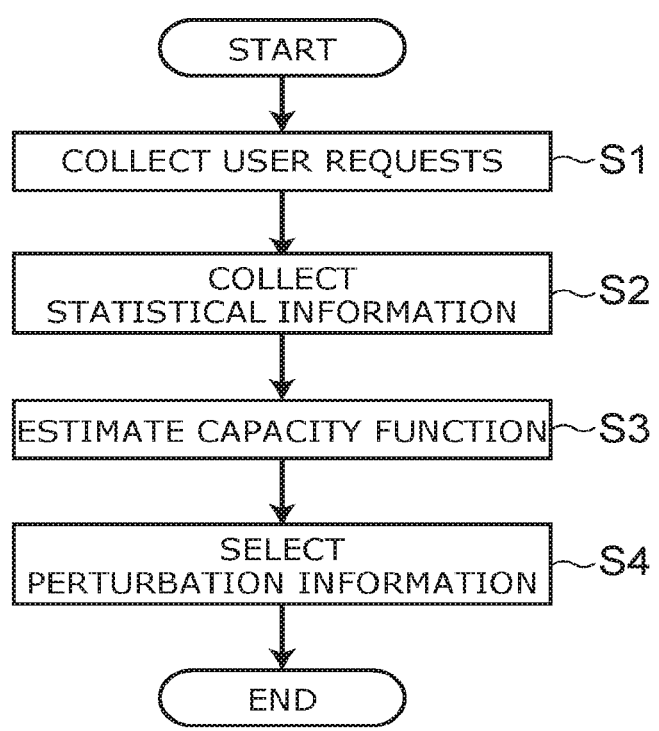
FIG. 15 is a flowchart illustrating a part of the processing of the database system according to the embodiment.

FIG. 15 is a flowchart illustrating a part of the processing of the database system according to the embodiment.

FIG. 15 is a flowchart illustrating the processing of the collector 36. The collector 36 collects the user requests sent from the client (step S1). The collector 36 collects statistical information relating to it's own node 30 and the multiple partitions of it's own node 30 (step S2). The collector 36 estimates the capacity function based on statistical information relating to the capacity (step S3). The collector 36 adds the estimated capacity function to the statistical information. The collector 36 generates perturbation information from the statistical information. The collector 36 selects a part of the multiple perturbation information (step S4).

It is sufficient for step S1 to be performed by the collector 36 of at least one of the multiple nodes 30. Steps S2 to S4 are performed by the collector 36 of each node 30. The collected user requests, statistical information, and perturbation information are sent to the management device 20.

Figure 16:
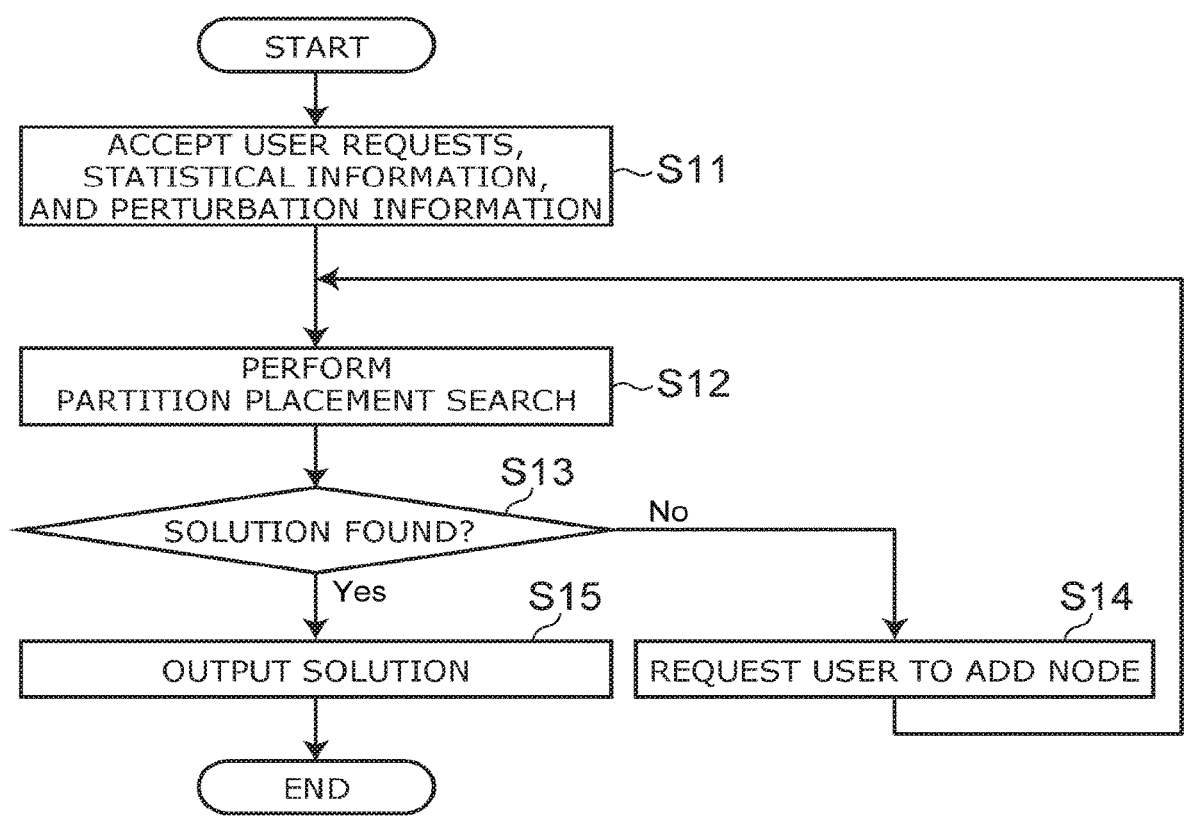
FIG. 16 is a flowchart illustrating a part of the processing of the calculating device according to the embodiment.

FIG. 16 is a flowchart illustrating a part of the processing of the calculating device according to the embodiment.

The calculator 23 accepts the user requests, the statistical information, and the perturbation information sent from the collector 36 (step S11). When deciding to start the search for the placement of the multiple partitions, the calculator 23 performs the search (step S12). The calculator 23 determines whether or not a solution is found (step S13). The solution is a placement of the multiple partitions that can improve the performance of the database system 10. When a solution is not found, the calculator 23 requests the user to add a node 30 (step S14). When a solution is found, the calculator 23 outputs the solution (step S15). When receiving the solution, each node 30 moves the multiple partitions according to the solution.

Effects of the embodiment will now be described.

For example, a method may be considered in which the placement of the multiple partitions is calculated to improve the performance of the database system by using only the statistical information including previously-observed data. In this method, the placement is calculated based on the previously-observed average data. Therefore, for example, after performing the placement, when the processing load such as the access requests, the data movement time, etc., greatly increases compared to statistical information, there is a possibility that the performance of the database system may greatly decrease or a failure may occur in a node 30. In a database system in which the fluctuation of the processing load or the like is large, it is desirable to calculate the placement so that the decrease of the performance of the database system and the occurrence of the failure of the nodes 30 can be suppressed even when a large fluctuation of the processing load occurs after performing the placement.

When accepting the statistical information, the calculating device according to the embodiment generates the fluctuation information. The fluctuation information is generated using the statistical information and the perturbation information corresponding to the statistical fluctuation included in the statistical information. The fluctuation of the processing load, etc., can be considered by using the fluctuation information to calculate the placement. For example, compared to the statistical information, in the fluctuation information, the capacity of each node 30 is low; the access frequency to each partition is high; the data size of each partition is large; or the data movement time between the nodes 30 is long.

There is a possibility that the performance of the database system 10 may be lower for the placement of the multiple partitions using the fluctuation information than for the placement of the multiple partitions using only the statistical information. However, by calculating using the fluctuation information, a placement can be obtained for which the decrease of the performance of the database system, the occurrence of the failure of the nodes 30, etc., can be suppressed even when large fluctuation of the processing load or the like occurs. In other words, a more robust placement of the multiple partitions can be obtained for the fluctuation of the processing load, etc.

In particular, as IoT becomes widespread in industrial fields, databases are being generated to record sensor data, logs, etc. Also, in industrial fields, the data size increases as time elapses and the sensor data, the logs, etc., are accumulated; therefore, a shared-nothing database in which scaling out is easy and consistency of the data can be maintained is used favorably.

In databases in such industrial fields, time-series data that has timestamps close to each other are merged frequently; and it is effective to place the multiple partitions collectively in the same node 30 as much as possible. On the other hand, the access frequency is higher for the partitions including data having new timestamps than for partitions including data having old timestamps. Therefore, it is effective to distribute the data having timestamp times close to each other in multiple nodes 30. This is because the performance of the database system 10 degrades when the access is concentrated in one node 30.

In an industrial database, the processing load is large when operating the production equipment; but the processing load is small when not operating the production equipment. In other words, the fluctuation of the processing load is large.

Considering such circumstances, in a database in industrial fields, it is desirable for the multiple partitions to be placed so that the decrease of the performance of the database system 10 can be suppressed even when the fluctuation of the processing load or the like is large.

According to the calculating device according to the embodiment, the placement of the multiple partitions can be calculated using the fluctuation information. Therefore, even in a database system in which the fluctuation of the processing load or the like is large, the placement of the multiple partitions can be obtained so that the performance of the database system 10 can be improved while suppressing the decrease of the performance of the database system 10 due to the fluctuation of the processing load, etc.

As described above, in an industrial database, the processing load is small when not operating the production equipment. It is desirable to perform the placement of the multiple partitions in a time period when the processing load is small. Therefore, the calculating device according to the embodiment accepts the tolerable time for performing the placement of the multiple partitions. When accepting the tolerable time, the calculating device calculates a placement that is performable within the tolerable time. Thereby, it is possible to reliably perform the placement of the multiple partitions in a time period when the processing load is small. For example, the likelihood of a large processing load occurring when performing the placement of the multiple partitions and a failure occurring in one of the nodes 30 can be reduced.

With the calculating device, the database system 10 including the calculating device, or the calculation method according to the embodiments described above, the performance of the database system 10 can be improved; and a more robust placement of the multiple partitions can be calculated. By using a program for causing a computer to operate as the calculating device according to the embodiment, the performance of the database system 10 can be improved; and the computer can calculate a more robust placement of the multiple partitions.

In addition to the calculation described above, the calculating device according to the embodiment may perform the following calculation. Here, similarly to the example described above, a case is described where the management device 20 includes a function as a calculating device (a second calculating device).

When the placement of the multiple partitions is obtained by the calculation described above, the calculator 23 calculates the movement sequence of the multiple partitions to a placement calculated from the placement at some time (e.g., the current time). Specifically, the calculator 23 formulates a problem for solving the movement sequence of the multiple partitions as an integer linear programming problem (ILP). The calculator 23 solves the formulated ILP by using a solver. For example, CPLEX (registered trademark), Gurobi (registered trademark), etc., can be used as the solver.

FIG. 17 is a figure illustrating an example of the formulated integer linear programming problem.

Here, $Z^+$ is taken as a set of non-negative integers (including 0). $B=\{0, 1\}$ is set. $T=\{1, 2, \ldots, |T|\}$ is set as the scheduling period. The scheduling period is the period in which the movement of the multiple partitions can be performed. For example, the start time and the end time of the scheduling period are designated by the client. $T_2=\{0, 1, 2, \ldots, |T|\}$ is set. $T_3=\{1, 2, \ldots, |T|-t_r^{max}\}$ is set. $N=\{1, 2, \ldots, |N|\}$ is a set of nodes. $C_n \in Z^+$ is taken as the storage capacity of node $n \in N$. $u_{n0} \in Z^+$ is taken as the initial value of the usage of the node n. In other words, $U_{n0}$ represents the usage of the node n at the original placement. $R=\{1, 2, \ldots, R\}$ is a set of move requests. The move request is represented by a set of four terms of $r=(s_r, d_r, t_r, m_r)$. $s_r \in N$ represents the source node. $d_r \in N$ represents the destination node. $t_r \in Z^+$ represents the movement time. $m_r \in Z^+$ represents the data size. Here, it is assumed that $m_r/t_r$ is an integer. $t_r^{max}=\max_{r} \in R^{tr}$. The bandwidth of the network is taken as $w_0 \in Z^+$. The IO bandwidth of the node n is taken as $W_n \in Z^+$. For example, the variables of the ILP are determined based on information predesignated by the client, information stored in the data storage part 31, information collected by the collector 36, etc.

$x_{rt} \in B$ is 1 when starting the movement of the move request $r \in R$ at the time $t \in T_2$, and otherwise is 0. At $t=0$, $x_{rt}=0$. Here, the range of t is expanded from T to $T_2$ because t is necessary for the calculation of the node usage. The usage of the node $n \in N$ at the time $t \in T$ is taken as $u_{nt} \in Z^+$. When the movement processing for the node n is completed at the time t, $u_{nt}$ represents the usage after processing. A dummy request is prepared, and is performed after the processing of all of the move requests; and the start time of the dummy request is taken as $t_\delta \in T$. The dummy request is prepared to indicate that all of the move requests have been processed. $y_{rt} \in B$ is 1 if the movement of the move request $r \in R$ is being performed at the time $t \in T$, and otherwise is 0.

In FIG. 17, Formula (1) is the objective function. Formula (1) represents minimizing (making earliest) the start time $t_\delta$ of the dummy request. In other words, the start time $t_\delta$ of the dummy request is the time when all of the move request processing is completed. A value is set in $y_{rt}$ by Formula (2). Constraints are applied to $x_{rt}$ by Formula (3) and Formula (4). Formula (3) is a constraint for uniquely determining the start time of the move request r. Formula (4) is a constraint for not starting the move request r at the time 0. Constraints are applied to $u_{nt}$ by Formula (5) and Formula (6). Formula (5) initializes $u_{nt}$. Formula (6) calculates $u_{nt}$ from $u_{nt-1}$ and the amount of processing (the movement amount of the data) at the time t. Here, for the added data, an increase of $m_r/t_r$ occurs each time; and for the extracted data, all of $m_r$ is consumed after the movement ends. Formula (7) is a constraint of the storage use rate. Formula (8) represents that the sum of the write amount of all nodes does not exceed the bandwidth of the network. Formula (9) represents that the sum of the write amount of one node does not exceed the IO bandwidth. The time $t_\delta$ is calculated by Formula (10).

The formulated ILP is solved to derive which partition should be moved when and to which node. When the calculator 23 cannot solve the ILP, "no solution" is output as the result of the calculation. For example, when "no solution" is output, the calculator 23 may request the client to add a node, extend the scheduling period, etc. However, as described above, the placement after the movement of the multiple partitions is calculated to be completable within a preset tolerable time. Accordingly, the ILP can be solved as long as the movement time of the partitions set when searching the placement of the multiple partitions does not deviate greatly from the movement time when searching the movement sequence.

FIG. 18 is an output example of the calculating device according to the embodiment.

For example, as illustrated in FIG. 18, the calculator 23 outputs, as the movement sequence, information (numerals) designating the partition, information designating the source node, information designating the destination node, the start time of the movement, and the end time of the movement. In the example of FIG. 18, the calculator 23 also outputs information designating the role of the partition and the system port. Such information of the movement sequence may be sent to the client so that the user can confirm.

The calculator 23 sends the calculation result to the node manager 34 of each node 30. When each of the node managers 34 receives the calculation result, each of the transferrers 35 sends the data set of the partition to another node 30 according to the calculated movement sequence. For example, the long-term synchronous processing described above is performed by the calculator 23 according to the calculated movement sequence.

Figure 19:
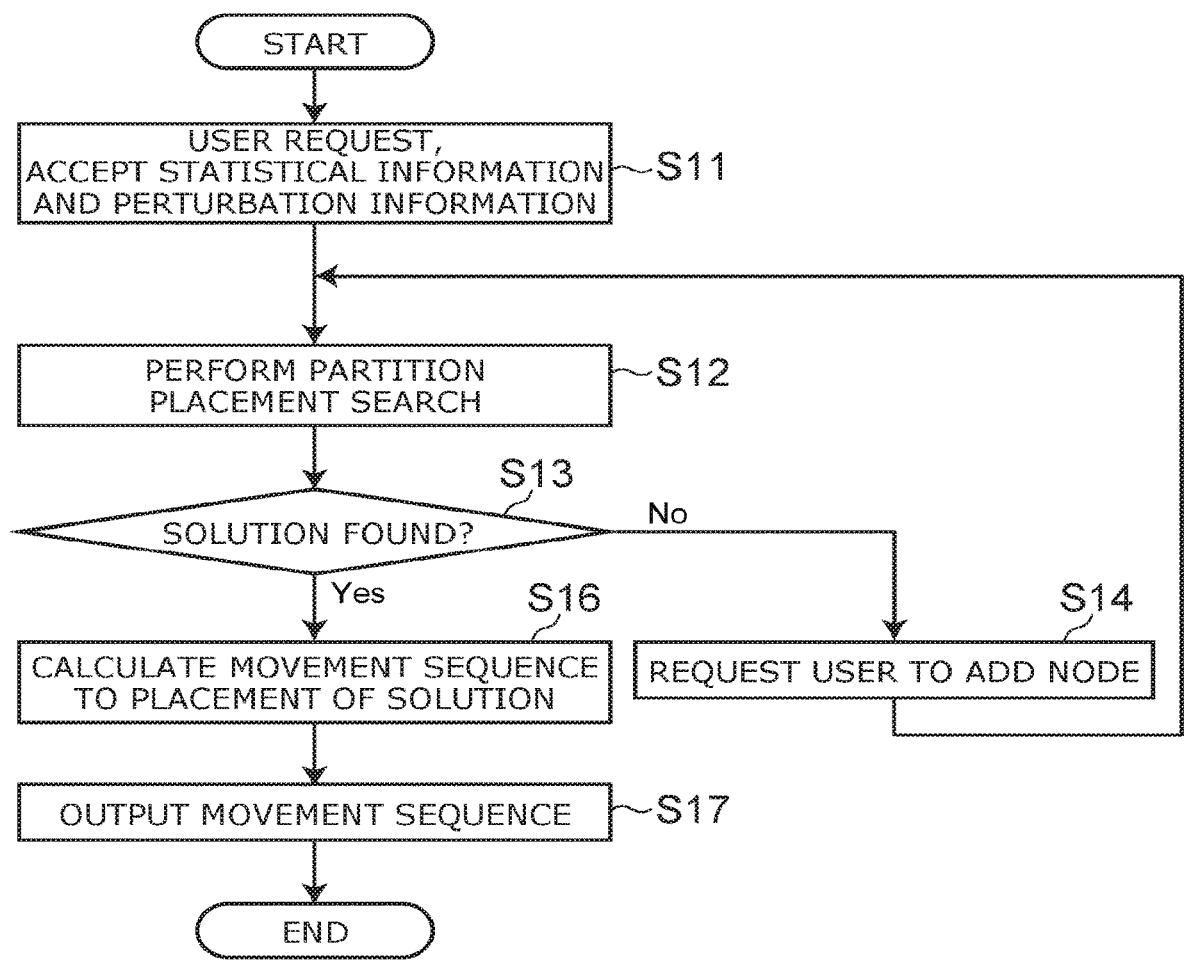
FIG. 19 is a flowchart illustrating a portion of the processing of the calculating device according to the embodiment.

FIG. 19 is a flowchart illustrating a portion of the processing of the calculating device according to the embodiment.

In the example illustrated in FIG. 19, the calculator 23 performs steps S11 to S14 similarly to the flowchart illustrated in FIG. 16. When a solution is found in step S13, the procedure to move the multiple partitions to the solution which is found is calculated (step S16). The calculator 23 outputs the movement procedure obtained by the calculation (step S17).

According to the calculating device according to the embodiment, a more appropriate movement sequence can be calculated when moving the multiple partitions. For example, by using the calculating device according to the embodiment, the movement of the multiple partitions can be completed more quickly. Also, by combining with the search of the placement of the multiple partitions described above, the multiple partitions can be moved in a shorter period of time to the found placement which is more robust.

Here, one calculator 23 is described as an example of the search of the placement of the multiple partitions and the calculation of the movement sequence. The search of the placement of the multiple partitions and the movement sequence of the multiple partitions may be calculated respectively by different calculating devices. For example, in a calculation system including multiple calculating devices, one calculating device calculates the search of the placement of the multiple partitions. The one calculating device sends the found placement to another calculating device. The other calculating device calculates the sequence for moving the multiple partitions to the found placement. For example, these calculating devices are connected to each other via the network.

Herein, an example is described in which the multiple partitions are moved to the placement found by the search. The calculating device according to the embodiment also can be used when moving the multiple partitions to a placement determined by a different method. For example, when another calculating device determines the placement of the multiple partitions by another method, the calculating device according to the embodiment can calculate the sequence for moving the multiple partitions to the placement. In such a case as well, the calculating device according to the embodiment can obtain the movement sequence of the multiple partitions by solving the formulated ILP.

The invention may include the following embodiments.

Embodiment 1

A calculating device performing at least a calculation for a database system, a database of the database system being split into a plurality of partitions and placed in a plurality of nodes, the device calculating, by solving an integer linear programming problem, a movement sequence when moving the plurality of partitions in the plurality of nodes to an other placement, the integer linear programming problem being preformulated.

Embodiment 2

The device according to embodiment 1, wherein the movement sequence includes the partition, the node of a source, the node of a destination, and a time of the movement, the partition being an object of the movement.

Embodiment 3

A database system including a plurality of nodes storing a database distributed in a plurality of partitions, the plurality of nodes electing, by mutual communication, any one node as a management device, the management device accepting statistical information relating to the plurality of partitions and the plurality of nodes and being collected by the plurality of nodes, the management device generating fluctuation information by using the statistical information and perturbation information, the perturbation information corresponding to statistical fluctuation of the statistical information, the management device calculating a placement of the plurality of partitions in the plurality of nodes by using the statistical information and the fluctuation information, the placement being capable of improving a performance of the database system, the management device calculating, by solving an integer linear programming problem, a movement sequence when moving the plurality of partitions to the placement, the integer linear programming problem being preformulated.

Embodiment 4

The system according to embodiment 3, wherein at least a portion of the plurality of partitions in the plurality of nodes is moved according to the movement sequence obtained by the calculation.

Embodiment 5

A calculation system, comprising:
a first calculating device; and
a second calculating device,
the first calculating device performing at least a calculation for a database system, a database of the database system being split into a plurality of partitions and placed in a plurality of nodes,
the first calculating device being configured to
accept statistical information relating to the plurality of partitions and the plurality of nodes and being collected by the plurality of nodes,
generate fluctuation information by using the statistical information and perturbation information, the perturbation information corresponding to statistical fluctuation of the statistical information, and
calculate a placement of the plurality of partitions in the plurality of nodes by using the statistical information and the fluctuation information, the placement being capable of improving a performance of the database system,
the second calculating device calculating, by solving an integer linear programming problem, a movement sequence when moving the plurality of partitions to the placement, the integer linear programming problem being preformulated.

Embodiment 6

A calculation method for a database system, a database of the database system being split into a plurality of partitions and placed in a plurality of nodes,
the method comprising calculating, by solving an integer linear programming problem, a movement sequence when moving the plurality of partitions in the plurality of nodes to an other placement, the integer linear programming problem being preformulated.

Embodiment 7

A storage medium storing a program causing a computer to perform at least a calculation for a database system, a database of the database system being split into a plurality of partitions and placed in a plurality of nodes,
the performing comprising calculating, by solving an integer linear programming problem, a movement sequence when moving the plurality of partitions in the plurality of nodes to an other placement, the integer linear programming problem being preformulated.

For example, the processing of the various data recited above is performed based on a program (software). For example, a computer stores the program and performs the processing of the various information recited above by reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The computer may acquire (or read) the program via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments and variations may be practiced in combination with each other.

What is claimed is:

1. A calculating device performing a calculation for a database system, a database of the database system being split into a plurality of partitions and placed in a plurality of nodes, the device comprising:
circuitry configured to:
receive statistical information relating to the plurality of partitions and the plurality of nodes, the statistical information being collected by the plurality of nodes;
generate fluctuation information using the statistical information and perturbation information, the perturbation information corresponding to a statistical fluctuation of the statistical information;
calculate a placement of the plurality of partitions in the plurality of nodes using the statistical information and the generated fluctuation information, the calculated placement improving a performance of the database system; and
transmit the calculated placement to each of the plurality of nodes so that a data set of at least one of the plurality of partitions is moved from at least one of the plurality of nodes to another of the plurality of nodes.

2. The device according to claim 1, wherein the circuitry is further configured to:
accept a tolerable time for performing the placement; and
calculate the placement to cause the placement to be performable within the tolerable time.

3. The device according to claim 1, wherein the statistical information received by the circuitry includes at least one of access frequencies to the plurality of partitions in the plurality of nodes, data sizes of the plurality of partitions in the plurality of nodes, movement times per unit data size between the plurality of partitions, or capacities of the plurality of nodes.

4. The device according to claim 1, wherein the circuitry is further configured to generate the fluctuation information to cause an evaluation value of the placement of the plurality of partitions based on the fluctuation information to be poorer than an evaluation value of the placement of the plurality of partitions based on the statistical information.

5. The device according to claim 1, wherein the circuitry is further configured to calculate the placement via a first processing and a second processing, the first processing includes:
 calculating an initial placement of the plurality of partitions in the plurality of nodes based on the statistical information;
 calculating a placement candidate of the plurality of partitions in the plurality of nodes based on a part of the fluctuation information; and
 using the initial placement as an employed placement when an evaluation value of the initial placement is better than an evaluation value of the placement candidate, and using the placement candidate as the employed placement when the evaluation value of the placement candidate is better than the evaluation value of the initial placement, and the second processing includes:
 calculating an other placement candidate of the plurality of partitions in the plurality of nodes based on an other part of the fluctuation information; and
 not modifying the employed placement when an evaluation value of the employed placement is higher than an evaluation value of the other placement candidate, and using the other placement candidate as the employed placement when the evaluation value of the other placement candidate is higher than the evaluation value of the employed placement.

6. The device according to claim 5, wherein the circuit is further configured to repeat the second processing in the calculating of the placement, and
 output the employed placement obtained by the repeating of the second processing as the placement of the plurality of partitions in the plurality of nodes, which improves the performance of the database system.

7. A database system, comprising:
 the calculating device according to claim 1; and
 the plurality of nodes,
 for the plurality of nodes, the placement is performed by moving at least one of the plurality of partitions between the plurality of nodes when the placement is obtained from the calculating device, and the at least one of the plurality of partitions is not moved when the placement is not obtained from the calculating device.

8. A database system including a plurality of nodes storing a database distributed into a plurality of partitions, the plurality of nodes electing, by mutual communication, any one node of the plurality of nodes as a management device, wherein the management device includes circuitry configured to
 receive statistical information relating to the plurality of partitions and the plurality of nodes, the statistical information being collected by the plurality of nodes,
 generate fluctuation information using the statistical information and perturbation information, the perturbation information corresponding to a, statistical fluctuation of the statistical information,
 calculate a placement of the plurality of partitions in the plurality of nodes using the statistical information and the venerated fluctuation information, the calculated placement improving a performance of the database system, and
 transmit the calculated placement to each of the plurality of nodes so that a data set of at least one of the plurality of partitions is moved from at least one of the plurality of nodes to another of the plurality of nodes.

9. A calculation method for a database system, a database of the database system being split into a plurality of partitions and placed in a plurality of nodes, the method comprising:
 receiving statistical information, the statistical information relating to the plurality of partitions and the plurality of nodes, the statistical information being collected by the plurality of nodes;
 generating fluctuation information using the statistical information and perturbation information, the perturbation information corresponding to a statistical fluctuation of the statistical information;
 calculating a placement of the plurality of partitions in the plurality of nodes using the statistical information and the fluctuation information, the calculated placement improving a performance of the database system; and
 transmitting the calculated placement to each of the plurality of nodes so that a data set of at least one of the plurality of partitions is moved from at least one of the plurality of nodes to another of the plurality of nodes.

10. The method according to claim 9, further comprising calculating, by solving an integer linear programming problem, a movement sequence when moving the plurality of partitions according to the placement, the integer linear programming problem being preformulated.

11. A non-transitory storage medium storing a program causing a computer to perform a method for a database system, a database of the database system being split into a plurality of partitions and placed in a plurality of nodes, the method comprising:
 receiving statistical information collected by the plurality of nodes, the statistical information relating to the plurality of partitions and the plurality of nodes, the statistical information being collected by the plurality of nodes;
 generating fluctuation information using the statistical information and perturbation information, the perturbation information corresponding to a statistical fluctuation of the statistical information;
 calculating a placement of the plurality of partitions in the plurality of nodes using the statistical information and the generated fluctuation information, the calculated placement improving a performance of the database system; and
 transmitting the calculated placement to each of the plurality of nodes so that a data set of at least one of the plurality of partitions is moved from at least one of the plurality of nodes to another of the plurality of nodes.

12. The non-transitory storage medium according to claim 11, wherein the method further comprises calculating, by solving an integer linear programming problem, a movement sequence when moving the plurality of partitions according to the placement, the integer linear programming problem being preformulated.

* * * * *